3,188,168
PURIFICATION OF SILICON COMPOUNDS
Howard B. Bradley, Tonawanda, N.Y., assignor to Union
  Carbide Corporation, a corporation of New York
  No Drawing. Filed June 4, 1962, Ser. No. 199,654
             13 Claims. (Cl. 23—14)

This invention relates to the process for the removal of impurities from silicon compounds through the use of a halogen. In particular, it relates to a process for the removal of "N-donor" type impurities, such as arsenic and phosphorus, from semi-conductor silicon raw materials by contacting such materials with iodine, bromine or chlorine to form high-boiling point compounds with the impurities which are then separable from the original silicon compound. The invention further relates to improved transistor grade silicon metal.

Silicon metal useful in semi-conductors, such as transistors, must be extremely pure so that (1) it acts as a semi-conductor; (2) its purity permits wide control over properties obtained through addition of "doping agents," such as aluminum, in desired calculated amounts; and (3) the desired resistivity and single crystallinity can be obtained. In general, it is desired that "semi-conductor grade" silicon metal contain less than 250 parts per billion (p.p.b.) by weight total impurities. Preferably, the silicon metal should contain less than 100 p.p.b. by weight total impurities. It is also desired that the kind of impurities be controlled. Some impurities, such as tin, can be tolerated in larger amounts than can phosphorus, arsenic and boron, for example. Tin is tetravalent and is to a limited extent compatible with the tetravalent silicon crystal lattice. Phosphorus and arsenic, on the other hand, are pentavalent and contribute excess electrons to the silicon crystal and can be tolerated to a certain extent only when an "n" type semi-conductor is desired. Similarly, boron, which is trivalent, causes a deficiency of electrons in the silicon crystal and can be tolerated only when a "p" type semi-conductor is desired.

Metallic silicon for semi-conductor use is generally prepared by reduction of silicon-containing compounds, such as silicon tetrachloride, trichlorosilane (HSiCl$_3$) and dichlorosilane (H$_2$SiCl$_2$), with hydrogen, zinc, sodium or metal hydrides, for example. Metallic silicon can also be obtained by thermal decomposition of compounds such as monosilane (SiH$_4$), monochlorosilane and to some extent trichlorosilane.

In order to obtain high purity silicon metal it is desirable to employ high purity starting materials. Many impurities, such as iron, copper and manganese, can be substantially completely removed from chlorosilanes, for example, by distillation. Other imprities, especially arsenic, phosphorus, boron, and even sulfur cannot be reduced to desired levels by simple distillation in a column containing about 10–100 theoretical distillation plates. Complex zone refining techniques on the metllic silicon are necessary to reduce the levels of such impurities to desired amounts. A single zone refining pass through the silicon metal product is generally employed to remove last traces of iron, copper and manganese, for example, but multiple passes are required to lower the arsenic, phosphorus and boron content.

It is a principal object of the present invention to provide a process for purifying silicon compounds prior to their conversion to silicon metal.

It is a further object to provide a process for removing arsenic and phosphorus impurities from silicon-containing compounds prior to their conversion to silicon metal and thus substantially reducing the amount of subsequent zone refining of the metal product.

This process is useful with silicon-containing compounds having the formula SiH$_a$X$_b$, where X is a halogen of the group consisting of fluorine, chlorine, bromine and iodine, $(a)$ and $(b)$ are integers from 0 to 4 inclusive and the sum of $(a)+(b)$ is 4. In carrying out the process of this invention, the silicon-containing compound is contacted with a halogen of the group consisting of iodine, bromine and chlorine under conditions resulting in the formation of high boiling point compounds with the arsenic and phosphorus impurities. These high boiling point halogen-impurity compounds are then separable, preferably by distillation, from the remaining silicon-containing compound. Fluorine is not considered to be useful in this process since it is extremely reactive and would involve great care to prevent reaction between fluorine and materials other than the impurities in the silicon-containing compound.

Any excess iodine, bromine or chlorine which may pass over into the purified silicon containing product is not harmful since it is readily volatilized and removed during the conversion of the silicon-containing compound to silicon metal.

The process conditions for carrying out this invention are not critical other than that the silicon-containing material should be contacted with the iodine, chlorine or bromine at a temperature below the decomposition temperature of the silicon-containing material. Preferably, the silicon compound is contacted with iodine, bromine or chlorine at the boiling point of the silicon compound so that it can be continuously removed by distillation from the halogen impurity compounds which remain in the residue. Atmospheric pressure conditions are also preferably employed. For example, trichlorosilane can be purified under reflux conditions of atmospheric pressure and about 32° C.

While it is preferred that the iodine, bromine or chlorine be used in elemental form, it is also within the scope of the present invention to employ halogen compounds which can release nascent iodine, bromine or chlorine for reaction with the arsenic and phosphorus impurities in the silicon-containing compound. Potassium iodide is an example of such a compound. An oxidizing agent will release free iodine from this compound.

The present process is especially useful for removing arsenic and phosphorus impurities from silicon-containing compounds. It is also useful for removing some boron and sulfur impurities as well.

Trichlorosilane is widely used as a raw material for the production of "semi-conductor grade" silicone. It is not known in what form the phosphorus and arsensic are present in trichlorosilane, but since it is substantially impossible to remove all the phosphorus and arsensic from trichlorosilane by distillation, it is believed that the arsenic and phosphorus impurities are present at least in part, in the form of relatively low boiling point compounds, such as H$_2$PCl or HPCl$_2$ and H$_2$AsCl or HAsCl$_2$. While I do not wish to be bound to any theoretical explanation, it is believed that the halogen reacts with such low-boiling impurity compounds to form a compound mass having a boiling point higher than the original impurities and higher than the silicon compounds which can be readily separated from the silicon-containing compounds having the previously described formula SiH$_a$X$_b$. In the case of trichlorosilane purification, iodine is the preferred halogen since it reacts very slowly, if at all, with the silicon-hydrogen bond of the trichlorosilane. Bromine and chlorine, on the other hand, readily form halogen-impurity compounds with the phosphorus and arsenic impurities but also have increased reactivity toward the silicon-containing compound. Iodine forms compounds with said impurities having higher boiling points than do the corresponding bromine-impurity and chlorine-impurity compounds. The iodine-impurity compounds are thus easier to separate by distillation from the silicon-containing compounds. As compared to removal of iodine-impurity compounds, a distillation step having an increased number of theoretical distillation plates is usually required to separate the bromine-impurity and chlorine-impurity compounds from the silicon-containing material.

Known physical and chemical methods fully capable of removing substantially all the arsensic and phosphorus impurities from silicon metal are expensive and complex. It is practically impossible by known techniques to remove substantially all of such impurities from the silicon raw materials. The halogen-purified silicon-containing compound, such as trichlorosilane, obtained by the present process contains less than 1 p.p.b. by weight arsenic and 1 p.p.b. by weight phosphorus. As such, this purified material has improved utility in the production of high quality silicon metal. Furthermore, the silicon metal obtained from this high purity starting material has substantially reduced zone refining requirements to reach the desired final product specifications. The abbreviation "p.p.b." used herein refers to parts per billion by weight or parts per $10^9$ by weight.

The as-formed silicon metal obtained directly from the purified silicon-containing compounds resulting from this process has a higher purity level than previously attained in this form. This as-formed high purity silicon metal containing less than about 1 p.p.b. by weight arsenic and 1 p.p.b. by weight phosphorus can have utility directly as raw material for some semi-conductor applications without further purification.

The invention will be illustrated by the following examples.

*Example I*

A 1-liter quantity of $HSiCl_3$ which had been analyzed and shown to contain 200 p.p.b. (parts per billion) by weight arsenic and 9 p.p.b. by weight phosphorus was distilled at atmospheric pressure and about 32° C. in a quartz column having one theoretical distillation plate. Analysis of the trichlorosilane distillate indicated that 63 weight percent of the arsenic and 50 weight percent of the phosphorus had been removed by this distillation. To the 975 ml. of trichlorosilane distillate was now added 50 milligrams crystalline iodine (about 0.005 weight percent) and the distillate was redistilled at atmospheric pressure and about 32° C. This time the retention of phosphorus and arsenic in the still-pot residue (25 ml.) was complete and there was no detectable phosphorus and arsenic in the trichlorosilane distillate by usual colorimetric techniques. The level of detection was about 0.5 p.p.b. by weight for the 1-liter sample employed. This indicates that halogen treatment can be used as a final purification step for treating silicon-containing materials which have been partially purified by other techniques. It also indicates that a halogen can be used to obtain a silicon compound free of arsenic and phosphorus.

*Example II*

To a 1-liter quantity of $HSiCl_3$ containing about 200 p.p.b. arsenic and about 9 p.p.b. phosphorus was added 1 gram of liquid bromine (about 0.1 weight percent). This mixture was then distilled at atmospheric pressure and about 32° C. in a quartz column having one theoretical distillation plate. The distillation residue (25 ml.) contained 98 weight percent of the phosphorus and arsenic originally present in the 1-liter quantity of $HSiCl_3$. This means that the 975 ml. $HSiCl_3$ distillate from the brominated trichlorosilane was free from all but 2 weight percent of the phosphorus and arsenic originally present in the 1-liter starting quantity.

The distillate from the above distillation was redistilled at atmospheric pressure and about 32° C. after having 25 milligrams crystalline iodine (about 0.002 weight percent) added to it. The trichlorosilane distillate from this distillation was free from phosphorus and arsenic (contained less than the colorimetric technique detectable limit of about 0.5 p.p.b. by weight); the still-pot residue (25 ml.) contained the remaining 2 weight percent of the original phosphorus and arsensic which had escaped with the distillate in the first distillation using bromine.

*Example III*

A liter of trichlorosilane commercial product was analyzed and the results indicated that it contained 34 p.p.b. by weight arsenic and 33 p.p.b. by weight phosphorus. One gram of crystalline iodine (about 0.1 weight percent) was added to this crude material and a distillation (one theoretical plate) at atmospheric pressure and about 32° C. was carried out. The trichlorosilane distillate was free from arsenic and phosphorus according to colorimertic techniques; furthermore, an emission spectrographic analysis showed that this distillate did not contain any detectable amounts of Al, Cu, Fe, Sn, Mo, Cr, Ni, Pb or Mn. The limits of spectrographic detection are: 20 p.p.b. Al; 20 p.p.b. Cu; 10 p.p.b. Fe; 2 p.p.b. each for Sn, Mo, Cr, Ni, Pb and Mn (all amounts by weight). This indicates that the halogen purification method, especially using iodine, is capable of delivering the purest $HSiCl_3$ available today.

*Example IV*

A 500 ml. quantity of $HSiCl_3$ containing 350 p.p.b. by weight arsenic was distilled at atmospheric pressure and about 32° C. in a quartz flask and Vigreux column (about 1½–2 theoretical plates) after having about 10 milligrams crystalline iodine added (about 0.002 weight percent). The trichlorosilane distillate was free of arsenic. This indicates that silicon-containing material containing relatively large quantities of arsenic and/or phosphorus impurities can be easily and completely purified with the halogen purification technique.

The above examples clearly demonstrate that arsenic and phosphorus impurities in trichlorosilane can be effectively and easily removed by treatment with a halogen.

While the above discussion has dealt principally with purifying trichlorosilane, it should be understood that the present invention is also useful for removing arsenic and phosphorous impurities from other silicon-containing compounds, such as silicon tetrachloride, dichlorosilane, monosilane, dibromosilane, triiodosilane and silicon tetrafluoride.

In commercial practice, trichlorosilane, for example, can be purified by adding elemental iodine to the still-pot in a continuous distillation process. The iodine can be added in large excess since it reacts only slowly with the trichlorosilane and this will make it unnecessary to replenish the iodine for long periods of time. Alternatively, the iodine may be added to the trichlorosilane in its shipping containers. The trichlorosilane can then be vaporized in a pure form from the container into the reduction process for preparation of metallic silicon.

While the preferred method of separating the halogen-impurity compound from the so-purified silicon-containinf material is the above described distillation technique, it should be understood that other separation methods, such as, selective adsorption of the halogen-impurity compound and differential diffusion through a membrane or porous medium could also be employed.

The amount of halogen employed to remove arsenic and phosphorus impurities from silicon-containing material is not narrowly critical as long as there is enough present to react with all of the arsenic and phosphorus impurities. It is preferred that excess halogen be present. Since the arsenic and phosphorus impurities are generally, in commercial practice, each present in amounts less than 500 p.p.b. by weight, it is convenient to have the halogen content in the silicon-containing material be about 0.001 to about 0.1 weight percent.

The formation of a high-boiling point compound mass between arsenic and phosphorus impurities and a halogen, such as iodine, can be useful not only to purify silicon-containing materials but also in an analytical procedure to analyze for arsenic and phosphorus in silicon-containing compounds. Sensitive colorimetric methods are known in the art for detecting arsenic and phosphorus in the range of 0.01 to 0.1 p.p.m. (parts per million) by weight. In order to increase the sensitivity of these techniques to the range of a few parts per billion by weight, a larger sample must be employed and the arsenic and phosphorus content of an aliquot portion of the sample must be increased. One method that has been suggested for increasing such arsenic and phosphorus content is to evaporate a large portion of the aliquot sample. The residual concentrated portion was intended to contain a larger amount of arsenic and phosphorus than would a similar volume of unevaporated sample. This method is not successful, however, for concentrating trace amounts of arsenic and phosphorus compounds since these materials are also volatilized somewhat during the evaporation concentration of the sample. Use of the halogen treatment, on the other hand, will concentrate all of the arsenic and phosphorus into the high boiling point halogen-impurity compounds. Evaporation of a large sample to a relatively small volume concentrated aliquot portion will thus retain all the arsenic and phosphorus. In this manner the colorimetric analytical methods can now be employed to detect trace amounts of arsenic and phosphorus in silicon-containing compounds in the range of 0.05 to 10 p.p.b. by weight depending on the size of the original sample employed.

The following example shows how this halogen-concentration process is useful in analytical work.

*Example V*

A 1200 ml. quantity of redistilled-and-analyzed phosphorus-free $HSiCl_3$ was mixed with 70 micrograms of phosphorus (as $PCl_3$). Measured aliquot portions of this solution were then reduced in volume by different evaporation methods. The resulting concentrates could then be used in a colorimetric analytical technique.

| Run No. | Micrograms P Added to Phosphorus-Free $HSiCl_3$ | Micrograms P Found in Residue (25 ml.) | Evaporation Method |
|---|---|---|---|
| 1 | [1] 1.45 | [1] 1.35 | None. |
| 2 | 5.8 | 4.0 | Iodine concentration in Teflon beaker followed by rapid evaporation. |
| 3 | 5.8 | 0 | Rapid evaporation—Nothing added. |
| 4 | 29.0 | 28.0 | Distillation in quartz—Iodine added before distillation. |
| 5 | 8.7 | 8.1 | Iodine concentration in Pyrex beaker followed by evaporation. |
| 6 | 8.2 | 7.8 | Iodine concentration in Teflon beaker followed by evaporation. |

[1] Run No. 1 was merely to show that the analytical method was capable of detecting the amount of phosphorus added.

These results indicate first, that substantially all of the phosphorus in the starting sample can be effectively and easily retained in the concentrate obtained after iodine treatment and second, that mere attempts at concentration without prior iodine treatment will volatilize the phosphorus material being analyzed.

The phosphorus and arsenic impurities are described herein in terms of parts by weight phosphorus or arsenic. These terms refer to equivalent weight of metal. The impurities are generally not present in elemental form but are present in some combined form such as arsenic or phosphorus compounds.

The following example demonstrates the utility of the halogen purification process for the preparation of high quality silicon metal.

*Example VI*

A quantity of trichlorosilane was divided into two portions. The first portion was distilled in an atmospheric distillation apparatus having about 1-2 theoretical plates. This distillate was labeled "Control." The second portion was also distilled in an atmospheric distillation apparatus having about 1-2 theoretical plates, but a minor amount of iodine was added to the trichlorosilane prior to distillation. The distillate from this portion was labeled "Purified." The two trichlorosilane distillates were then used as raw material for production of silicon metal in a process known in the art as the "Siemens process" employing filament deposition. The two silicon metal products without further purification were then evaluated for electrical resistivity by standard electrical methods. The "Purified" trichlorosilane produced silicon metal having a substantially increased uncompensated electrical resistivity over the silicon metal prepared from the "Control" trichlorosilane distillate. This increased electrical resistivity indicates substantial reduction in N-donor type impurities such as phosphorus and arsenic.

What is claimed is:

1. A process for removing impurities, principally arsenic and phosphorus impurities, from silicon-containing material having the formula $SiH_aX_b$ wherein X is a halogen, $(a)$ and $(b)$ are integers from 0 to 4 inclusive and the sum of $(a)+(b)$ is 4 which comprises contacting the silicon-containing material with a halogen selected from the class consisting of iodine, bromine and chlorine to form high boiling point halogen-impurity compounds and then separating said halogen-impurity compounds from the silicon-containing material.

2. A process for removing impurities, principally arsenic and phosphorus impurities, from silicon-containing material having the formula $SiH_aX_b$ wherein X is a halogen, $(a)$ and $(b)$ are integers from 0 to 4 inclusive and the sum of $(a)+(b)$ is 4 which comprises contacting the silicon-containing material with a halogen selected from the class consisting of iodine, bromine and chlorine to form high boiling point halogen-impurity compounds and then separating the high boiling point halogen-impurity compounds from the relatively lower boiling point silicon-containing material by means of distillation.

3. A process for removing arsenic and phosphorus impurities as claimed in claim 1 wherein the silicon-containing material is selected from the class consisting of trichlorosilane, silicon tetrachloride, dichlorosilane and monosilane.

4. A process for removing arsenic and phosphorus impurities as claimed in claim 2 wherein the silicon-containing material is selected from the class consisting of trichlorosilane, silicon tetrachloride, dichlorosilane and monosilane.

5. A process for removing arsenic and phosphorus impurities as claimed in claim 1 wherein the halogen is iodine.

6. A process for removing arsenic and phosphorus impurities as claimed in claim 2 wherein the halogen is iodine.

7. A process for removing arsenic and phosphorus impurities from trichlorosilane which comprises contacting trichlorosilane with iodine to form a high boiling point iodine-arsenic-phosphorus impurity compound mass and then separating the high boiling point iodine-arsenic-phosphorus impurity compound mass from the relatively lower boiling point trichlorosilane by means of distillation.

8. In an analytical procedure for analysis of arsenic and phosphorus impurities in a sample of a silicon-containing compound having the formula $SiH_aX_b$ wherein X is a halogen, $(a)$ and $(b)$ are integers from 0 to 4 inclusive and the sum of $(a)+(b)$ is 4, the improvement which comprises concentrating the arsenic and phosphorus impurities by contacting the sample of silicon-containing compound with a halogen selected from the class consisting of iodine, bromine and chlorine to form high boiling point halogen-impurity compounds and then separating said concentrated halogen-impurity compounds from the remaining portion of the silicon-containing compound sample.

9. In an analytical procedure for analysis of arsenic and phosphorus impurities in a silicon-containing material of the type claimed in claim 8 wherein the halogen is iodine.

10. In an analytical procedure for analysis of arsenic and phosphorus impurities in a sample of a silicon-containing compound, having the formula $SiH_aX_b$ wherein X is a halogen, $(a)$ and $(b)$ are integers from 0 to 4 inclusive and the sum of $(a)+(b)$ is 4, the improvement which comprises concentrating the arsenic and phosphorus impurities by contacting the sample of silicon-containing compound with a halogen selected from the class consisting of iodine, bromine and chlorine to form high boiling point halogen-impurity compounds and then separating the concentrated high boiling point halogen-impurity compounds from the remaining portion of the relatively lower boiling point silicon-containing compound sample by means of distillation.

11. In an analytical procedure for analysis of arsenic and phosphorus impurities in a silicon-containing material of the type claimed in claim 10 wherein the halogen is iodine.

12. A process for removing arsenic and phosphorus impurities from silicon-containing material as claimed in claim 1 wherein the halogen is present in an amount of about 0.001 to about 0.1 weight percent of the silicon-containing material.

13. A process for removing arsenic and phosphorus impurities from silicon-containing material as claimed in claim 2 wherein the halogen is present in an amount of about 0.001 to about 0.1 weight percent of the silicon-containing material.

References Cited by the Examiner
UNITED STATES PATENTS

| | | | |
|---|---|---|---|
| 2,844,441 | 7/58 | Pellin | 23—223.5 X |
| 2,857,249 | 10/58 | Wolff | 23—223.5 X |
| 2,943,918 | 7/60 | Pauls | 23—223.5 |
| 2,971,607 | 2/61 | Caswell | 23—204 X |
| 2,999,736 | 9/61 | Shalit | 23—223.5 |
| 3,010,797 | 11/61 | Aries | 23—223.5 |
| 3,016,291 | 1/62 | Aries | 23—223.5 |
| 3,020,128 | 2/62 | Adcock | 23—223.5 |
| 3,041,141 | 6/62 | Shoemaker et al. | 23—223.5 X |
| 3,071,444 | 1/63 | Theurerer | 23—223.5 |

MAURICE A. BRINDISI, *Primary Examiner.*